United States Patent [19]
Arai et al.

[11] Patent Number: 4,974,445
[45] Date of Patent: Dec. 4, 1990

[54] HOT WIRE TYPE OF AIR FLOW METER AND INTERNAL COMBUSTION ENGINE USING THE SAME

[75] Inventors: Nobukatsu Arai, Ushiku; Yoshihito Sekine, Ibaraki; Tetsuo Matsukura, Katsuta; Mitsukuni Tsutsui, Ibaraki; Hiroatsu Tokuda, Katsuta; Tadao Osawa, Katsuta; Toshifumi Usui, Katsuta, all of Japan

[73] Assignee: Hitachi, Ltd., Tokyo, Japan

[21] Appl. No.: 396,654

[22] Filed: Aug. 22, 1989

Related U.S. Application Data

[62] Division of Ser. No. 260,781, Oct. 21, 1988, abandoned.

[30] Foreign Application Priority Data

Oct. 23, 1987 [JP] Japan ................ 62-266384

[51] Int. Cl.⁵ ............................................. G01M 15/00
[52] U.S. Cl. ......................................................... 73/118.2
[58] Field of Search ............ 73/118.2, 204.11, 204.14, 73/204.21–204.27, 202, 202.5

[56] References Cited

U.S. PATENT DOCUMENTS

| | | | |
|---|---|---|---|
| 4,468,957 | 9/1984 | Sumal | 73/118.2 |
| 4,624,134 | 11/1986 | Nagano | 73/118.2 |
| 4,776,213 | 10/1988 | Blechinger et al. | 73/118.2 |
| 4,870,857 | 10/1989 | Smith | 73/118.2 |

FOREIGN PATENT DOCUMENTS

| | | | |
|---|---|---|---|
| 0004813 | 1/1985 | Japan | 73/204.22 |
| 0229331 | 9/1988 | Japan | 73/204.27 |

*Primary Examiner*—Robert Raevis
*Attorney, Agent, or Firm*—Antonelli, Terry, Stout & Kraus

[57] ABSTRACT

The present invention whose object is to provide a hot wire type of flow meter capable of accurately detecting a flow rate under various conditions required for satisfying a desire for low fuel consumption of an engine system and space saving in an engine room, the present invention being characterized in a hot wire type of air flow meter including a main flow passage forming an air intake flow passage of an internal combustion engine, a hot wire element measuring intake air, and a bypass having the hot wire element therein and disposed in the main flow passage, the hot wire type of air flow meter comprising: a flow passage forming the bypass, and formed in the axial direction of the main flow passage; and a flow passage forming the bypass and formed in the radial direction of the main flow passage, the flow passage having a structure designed in such a manner that the upper stream portion of an outlet portion thereof projects over the lower stream portion of the same.

17 Claims, 15 Drawing Sheets

FIG. 8
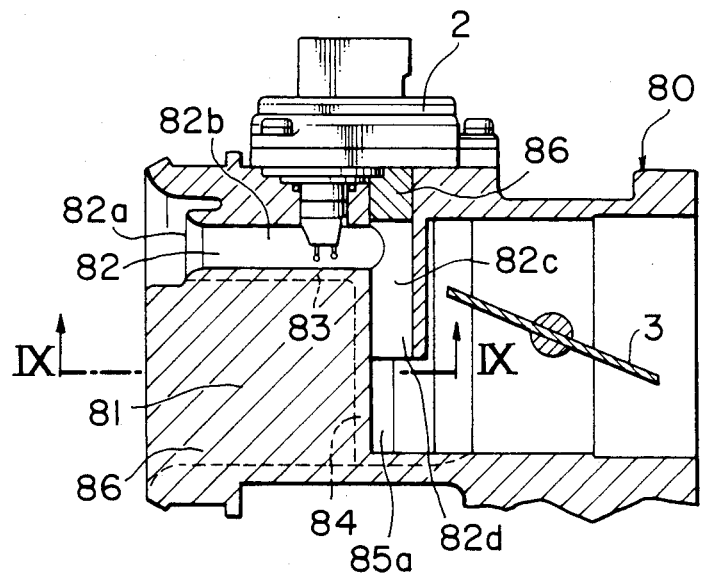
FIG. 10
FIG. 9
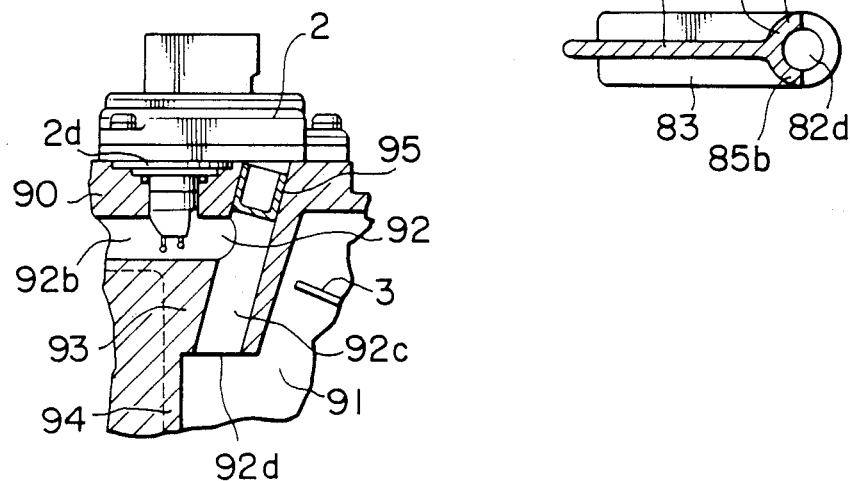

HOT WIRE TYPE OF AIR FLOW METER AND INTERNAL COMBUSTION ENGINE USING THE SAME

This application is a division of application Ser. No. 260,781 filed Oct. 21, 1988, now abandoned.

BACKGROUND OF THE INVENTION

1. Field of the Invention

This invention relates to a hot wire type of air flow meter, and more particularly to a hot wire type of air flow meter as used in an air intake system of an automobile for detecting and controlling the quantity of intake air.

2. Background of the Invention

Hitherto, as disclosed in Japanese Patent Unexamined Publication No. 50-50520, Japanese Patent Unexamined Publication No. 50-146369 and Japanese Patent Unexamined Publication No. 55-69021, there is a hot wire type of air flow meter for an internal combustion engine so constituted that a straight-shaped bypass (branch pipe) is disposed in the central portion of a main pipe and hot wire elements are disposed therein. However, in the structure disclosed in Japanese Patent Unexamined Publication No. 50-50520, such hot-wire element is not protected from reverse heat due to backfire caused from incorrect engine ignition timing. To this end, a structure for protecting the hot wire element against backfire has been disclosed, for example, in Japanese Patent Unexamined Publication No. 55-69021. However, a hot wire element generally has characteristics such that the output therefrom is reduced although the average flow velocity increases in a case where the same is disposed in a flow having a large pulsation due to the nonlinear heat transfer coefficient thereof. Therefore, any of the above-described structure cannot correctly detect the flow rate of a pulsation flow.

As disclosed in Japanese Utility Model Unexamined Publication No. 56-135127, in a bypass in which a hot wire element is disposed in the main pipe, in order to perform protection against the above-described backfire or correctly detect the flow rate of the pulsation flow, the fluid resistance at the bypass in the lower stream to the hot wire element is enlarged, additionally, the outlet and inlet ports of the bypass are formed in parallel or substantially in parallel to the main stream. That is, the dynamic pressure acting at the outlet and inlet ports of the bypass is reduced even if a reverse flow is generated and the flow reaching the hot wire element also is damped so that backfire resistance is improved. Since the outlet port of the bypass opens directly and substantially in parallel to the main stream, the flow in the bypass is slightly changed due to the static pressure change caused from mixture of flows at this portion. It leads to generation of noise in the output from the hot wire element. Although high frequency noise can be reduced by a filter disposed in the circuit, the abovedescribed type of noise causes a system control problem when, for example, the engine is operated at a low speed. Furthermore, from the viewpoint of hardware, the structure produces production (cost and weight) and reliability (the number of parts) problems since the axial length is too long and the component parts for the bypass are difficult to mount.

On the other hand, structures have been disclosed, for example, in Japanese Patent Unexamined Publication No. 56-76012, in which a bypass in which a hot wire element is disposed is formed outside the main stream in order to prevent the above-described type of backfire and stabilize the outputs.

However, problems arise in these structures, as pointed out in Japanese Patent Unexamined Publication No. 56-76012, that flow rate detection error in large due to the thermal conditions, such as thermal conduction from the engine, heating of the hot wire element, and in the case of an automobile, engine heat and rise in temperature in the engine compartment due to solar radiation. That is, since the bypass portion provided with the hot wire element has a large thermal capacity and is formed with a relatively tight width in the inner portion of a body wall, there is not a large area for conducting the heat of the intake air. Furthermore, the bypass is formed to perform a good thermal conduction of the air flow passing therein. Therefore, the temperature of the air flow in the bypass is affected by the temperature of the passage wall of the bypass, causing a large temperature difference from that of the main flow. It leads to enlargement of the error in measurement of the intake air flow rate.

Some of the disclosures relate to a structure which cannot withstand strong engine backfire and are incapable of correctly detecting the average flow rate of the pulsation flow, so that such devices cannot be put to practical use. Some of them are incapable of correctly measuring the flow rate under certain thermal conditions and are also incapable of being sufficiently controlled to have the engine operated at the most suitable air-fuel ratio due to increase in the noise in the output. Therefore, it interrupts cleaning of the exhaust gas from the engine, improvement in fuel consumption and operability. On the other hand, some of them are insufficient in reduction of the axial length of the main flow meter body, that is, they are insufficient in reduction of the length of the intake pipe, weight of the body and manufacturing cost. Therefore, problems arise that the pressure loss in the intake pipe increases, and the weight of the system including the engine becomes heavier, preventing improvement in engine fuel consumption and reduction of the engine room space.

SUMMARY OF THE INVENTION

An object of the present invention is to provide a hot wire type of flow meter capable of correctly detecting flow rate under a variety of conditions needed for achieving low fuel consumption of the engine system and small space in the engine compartment.

Another object of the present invention is to provide an internal combustion engine capable of controlling the most suitable air-fuel ratio by using the above-described type of hot wire type of air flow meter.

In order to achieve the above-described objects, a hot wire type of flow meter according to the present invention includes a main flow passage forming an air intake flow passage of an internal combustion engine, a hot wire element measuring intake air, and a bypass having the hot wire element therein and disposed in the main flow passage. Such a flow meter comprises: a flow passage forming the bypass and formed in the axial direction of the main flow passage; and a flow passage forming the bypass and formed in the radial direction of the main flow passage, the flow passage having the structure designed in such a manner that the upper stream portion of an outlet portion thereof projects over the lower stream portion of the same.

An internal combustion engine according to the present invention comprises: the above-described hot wire type of air flow meter; a speed sensor for detecting the engine speed; a fuel injection device for injecting fuel into the intake air; and a control device, responsive to a quantity of intake air detected by the hot wire type of air flow meter and the engine speed detected by the speed sensor, for obtaining a corresponding amount of fuel to be injected, and outputting an instruction to inject fuel by the thus-obtained quantity to the fuel injection device.

As a result of the features as described above, since the area serving for heat exchange between the bypass wall and the main stream can be widened, the temperature of the bypass wall can be always maintained to the level approximate to the intake air temperature so that temperature characteristics can be improved.

Furthermore, since the bypass is formed perpendicular to the lower stream of the hot wire element and having an outlet port surface thereof formed in parallel to the main stream, the direct effect of the dynamic pressure of the reversed flow on the outlet port, and as well its flow velocity in the flow passage can be damped. That is, introducing the force of the reversed flow due to backfire or blowback into the bypass can be reduced, and the introduced flow can be damped in the flow passage for the purpose of protecting the hot wire element against damage. The rectifying elements of the flow meter, such as a throttle portion of the inlet port of the bypass, a mesh and a throttle portion of the inlet port of the bypass (bell mouth shape) can reduce the disorder from the upper stream of the flow meter.

BRIEF DESCRIPTION OF THE DRAWINGS

FIG. 8 is a vertical cross-sectional view illustrating a third embodiment of the present invention;

FIG. 9 is a cross-sectional view taken along the line IX—IX in FIG. 8;

FIG. 10 illustrates a fourth embodiment of the present invention;

DESCRIPTION OF PREFERRED EMBODIMENTS

Embodiments of the present invention will now be described with reference to the drawings.

Figure 1:
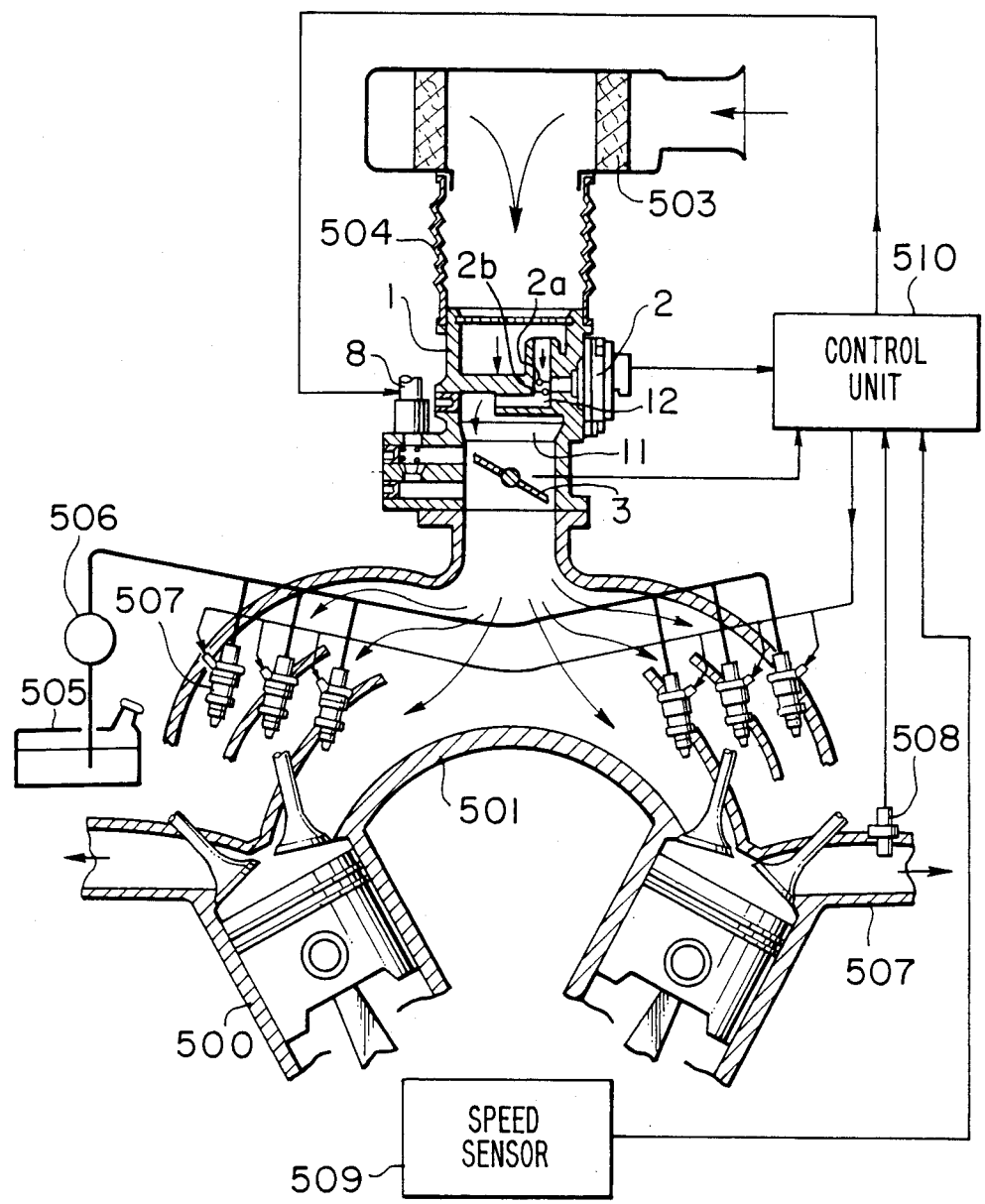
FIG. 1 is a schematic view illustrating an internal combustion engine employing a hot wire type of air flow meter according to the present invention.
Figure 2:
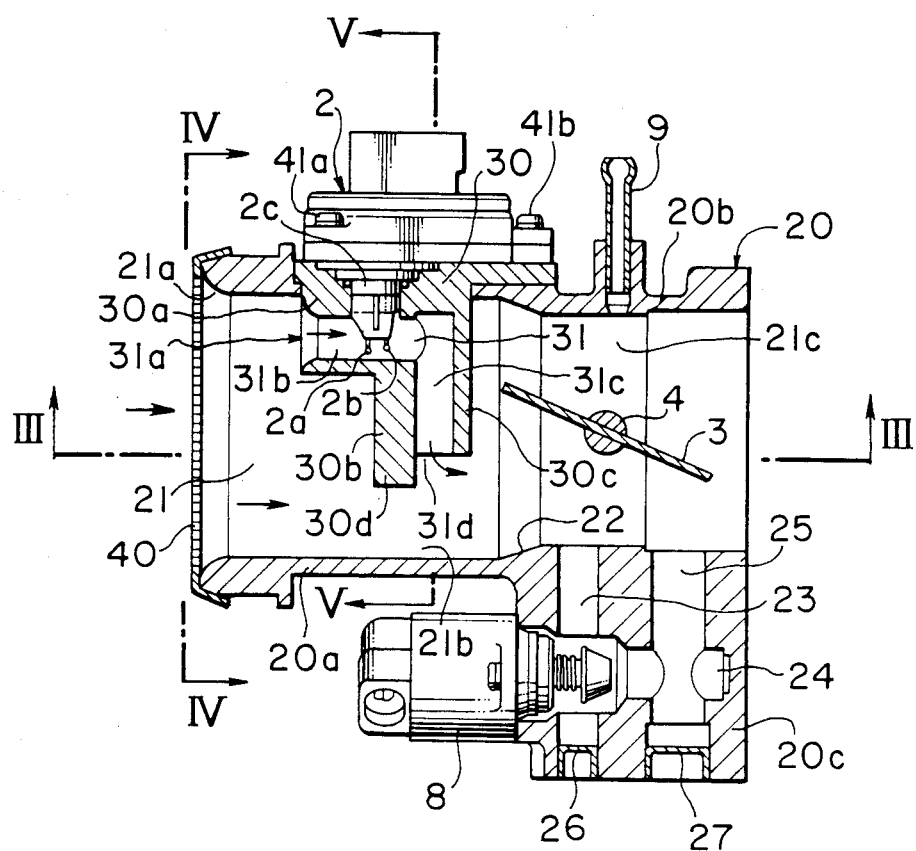
FIG. 2 is a cross-sectional view illustrating a hot wire type of air flow meter according to a first embodiment of the present invention.
Figure 3:
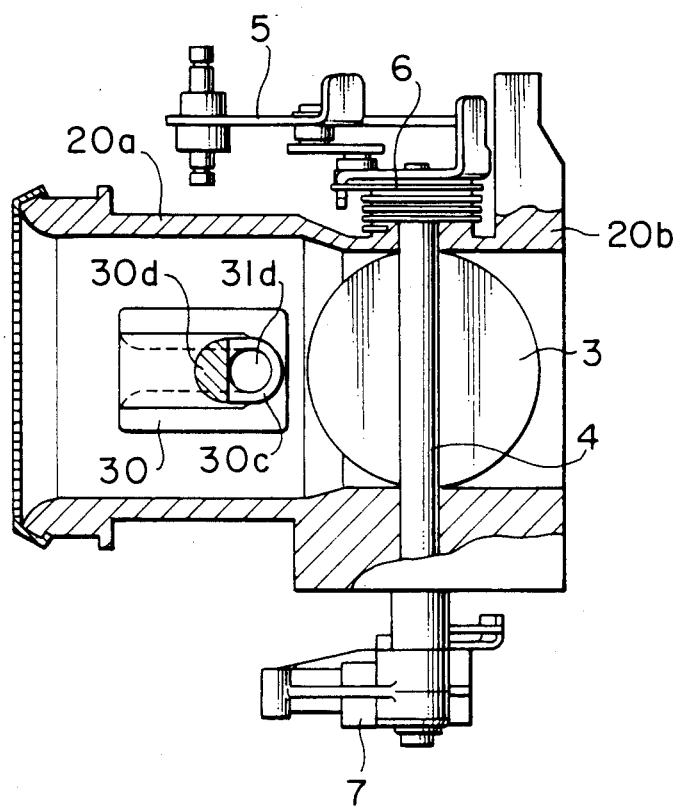
FIG. 3 is a cross-sectional view taken along the line III—III in FIG. 2.
Figure 4:
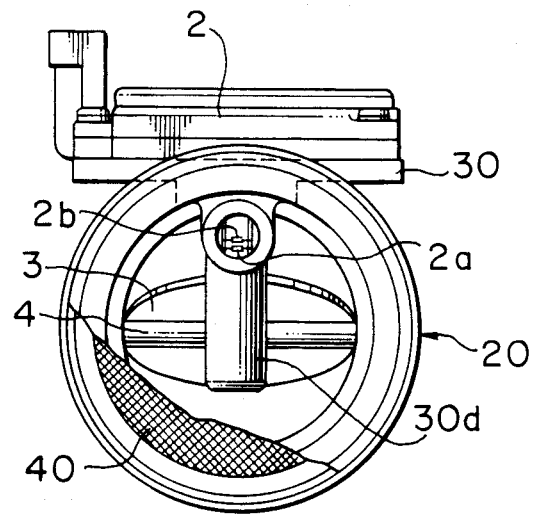
FIG. 4 is a view taken along the line IV—IV in FIG. 2.
Figure 5:
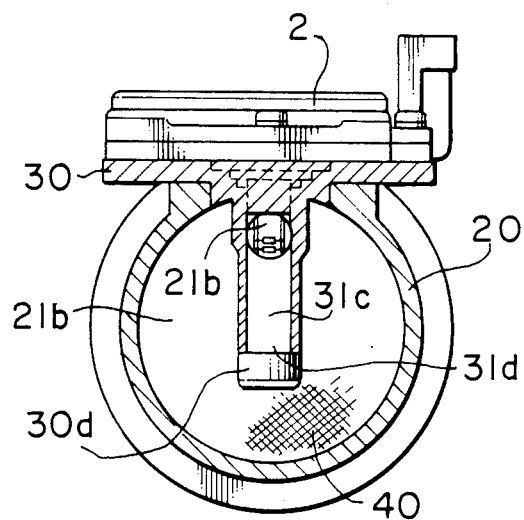
FIG. 5 is a cross-sectional view taken along the line V—V in FIG. 2.

FIG. 1 illustrates an embodiment of a system of an internal combustion engine equipped with an electronic fuel injection device to which an hot wire type of air flow meter for an internal combustion engine according to the present invention is applied.

Air is taken in through an air filter 503, and is supplied to an internal combustion engine (cylinder) 500 after it has passed through a connecting pipe 504, a flow meter 1 and an air intake manifold 501. A bypass 12 projecting to a main passage 11 is formed in the flow meter 1. A hot wire element 2a and a temperature compensation element 2b formed integral with a detecting circuit 2 are provided within the bypass 12 for the purpose of obtaining an output corresponding to the total quantity of intake air by detecting air flow velocity at this portion. A throttle valve 3 for controlling a quantity of intake air is provided within the passage of the flow meter 1, this throttle valve 3 being designed to act in synchronization with the accelerator pedal of an automobile. The flow meter 1 is further provided with an idle-speed control (ISC) valve 8 for controlling a flow rate when the throttle valve 3 is completely closed (idling).

On the other hand, fuel introduced from a fuel chamber 505 by a pump 506 is injected into an air intake manifold 501 by an injector 507 so that the fuel is supplied to the engine 500 together with the air.

The control unit 510 receives an output signal from the hot wire circuit 2, a signal representing the rotational angular degree of the throttle valve 3, an output signal from an oxygen density sensor 508 disposed in an exhaust manifold 507, ah output signal from an engine revolution speed sensor 509 and so forth, whereby a quantity of fuel to be injected and the opening degree of an ISC valve 8 are calculated. In response to these calculations, the control unit 510 controls the injector 507 and the ISC valve 8.

FIGS. 2 to 5 illustrate a hot wire type of flow meter according to a first embodiment of the present invention.

A body 20 is constituted by integrally diecast-forming a flow-meter body 20a, a throttle valve body 20b and an ISC-valve body 20c. An inlet port of the flow-meter body 20a is provided with a full-mesh body 40 for rectifying the flow, while the inlet portion 21a of the flow passage is designed in the form of a bell-mouth. A probe holder block 30 in which a bypass 31 is formed is inserted into the lower stream to the bell-mouth shaped portion from the outside of the flow meter body 20a. The sensor circuit unit 2 is screw-fixed to this probe holder block 30 by screws 41a and 41b in such a manner that the hot wire element 2a and the temperature compensation element 2b are, as shown in the figure, disposed in the bypass 31b formed in parallel to the main stream. As a result of the above-described structure, the probe holder block 30 is detachable from the outer surface of the body 20. In the throttle body 20b, the throttle valve 3 for controlling a quantity of air is formed in a flow passage 21c thereof and a valve shaft 4 for moving this throttle valve 3 is formed in such a manner that it penetrates the body 20b. A lever mechanism 5, a spring 6 and a throttle position sensor are formed outside the body 20b in such a manner that they are connected to the shaft 4. The portion in the vicinity of the ISC valve body 20c is provided with the ISC valve 8 for controlling the air flow rate at the time of the engine idling, that is, when the throttle valve 3 is completely closed, and air flow passages 23, 24 and 25 connected to this ISC valve 8. Illustrated plugs 26 and 27 are provided for plugging unnecessary passages which are not used as the flow passage since each of the passages 23 and 25 are formed from the outer surface of the body 20c. A pipe 9 serves to take out negative pressure in the lower stream to the throttle valve 3.

An axial bypass 31b formed in parallel to the main flow passage 21 and having an inlet port 31a in the form of a bell-mouth disposed in the upper stream portion of the flow meter body 20a is formed in an upper portion 30a of the probe holder block 30. This bypass 31b has a circular cross-sectional shape of a relatively narrower width than the main flow passage. In this upper portion 30a, a bypass 31c designed perpendicular to the above-described bypass 31b and having an outlet port 31d whose opened face is arranged in parallel to the main stream is formed in such a manner that the length thereof is longer than the radius of the main flow passage. As a result of this, a branch and mix flow passage system which consists of the main flow passage 21 and the bypass 31 are constituted in the flow meter. The bypass 31 is formed in such a manner that the flow resistance thereof, that is, the pressure loss of the flow is larger than that at the main stream due to the flow resistance factor caused from the shape of a two-dimensional L-shaped right angle bent and the frictional resistance factor of the passage wall. The hot wire element 2a and the temperature compensation element 2b are disposed in the bypass 31b in such a manner that a holder portion 2c formed integral with the circuit unit 2 penetrates a hole disposed in the probe holder block 30. As a result of the above-described structure, since the major portion of the outer wall of the probe holder block 30 is positioned in contact with the main stream, the temperature of the flow passage's wall of the bypass 31b can be maintained at substantially the same temperature as that of the intake air so that flow rate can be measured involving a relatively smaller error even if outside heat is effected. Furthermore, introducing force of reversed flow into the bypass 31 can be reduced so that the hot wire element 2a and so forth can be protected. In addition, since the flow passage resistance of the bypass 31 has a great effect for damping pulsation, abnormal output caused from excessive intake air pulsation can be prevented.

As described above, the axial bypass 31a has the throttle at the inlet port portion 31a and is designed in such a manner that the length thereof from the inlet port to the hot wire element 2a is twice the inner diameter thereof. These structures assists, in association with the full-mesh body 40 and the throttle, to reduce disorder of the flow introduced from the upper stream of the flow meter and thereby to achieve the low-noise system.

On the other hand, the bypass 31c is disposed so as to make the length thereof longer than the radius of the main stream, that is, the same is disposed at a portion 21b where the area of the main flow passage 21 becomes minimum, this portion being below the throttle valve shaft 4 disposed in the lower stream thereof. The outlet port 31d of the bypass 31c is a pent-roof member formed by extending a wall 30b of the probe holder block, and direct contact of the main stream thereto is prevented by an air shield wall 30d whose lower stream wall surface is perpendicular to the main stream. Since the outlet port is disposed in the main stream where the flow passes smoothly with relatively reduced effect from the movement of the throttle valve, and thanks to the provision of this pent-roof member, occurrence of mixture of flows immediately behind the bypass outlet port 31d is prevented, causing the velocity change in the bypass to be prevented. As a result of this, a further low noise system can be achieved. Furthermore, the circular cross-sectional shape of the bypass 31c, each shape of the walls 30b and 30d in the upper stream of the main stream and the circular shape of the wall 30c in the lower stream thereto also contribute to reducing noises.

A throttle 22 disposed in the end portion of the throttle body 20b in the lower stream slightly positioned away from the bypass outlet port 31d stabilizes the flow in the bypass 31 when the throttle valve 3 is moved, that is, stabilizes the flow rate distribution to the main flow passage 21 and bypass 31. As a result, the throttle valve 3 can be disposed adjacent to the flow meter.

Therefore, in accordance with this embodiment, a hot wire type of air flow meter capable of accurately measuring an amount of air taken in an engine and exhibiting high reliability can be provided only with a significantly short axial length thereof and at low cost.

Since a throttle valve can be adjacently and integrally formed, the weight can be reduced. Consequently, the purifying engine exhaust gas, improvement of fuel consumption and reduction in its space in the engine room can be achieved.

Figure 6:
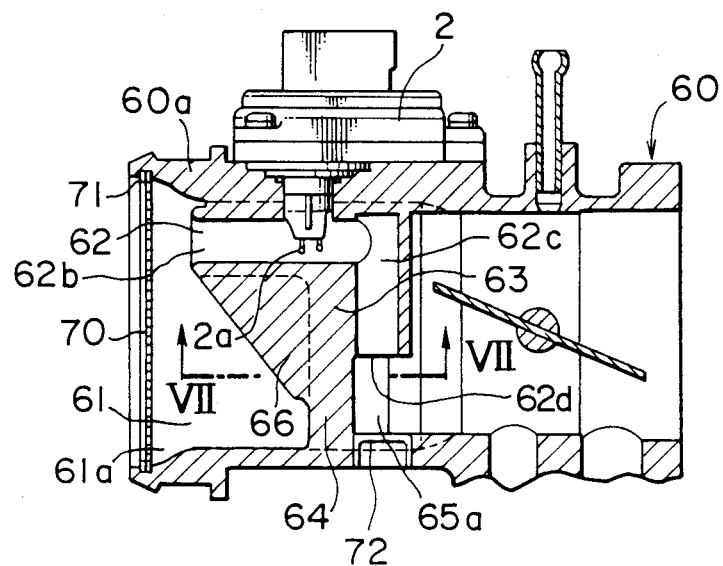
FIG. 6 is a vertical cross-sectional view illustrating a second embodiment of the present invention.
Figure 7:
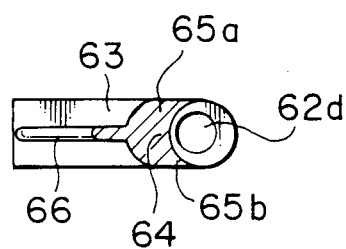
FIG. 7 is a cross-sectional view taken along the line VII—VII in FIG. 6.

FIGS. 6 and 7 illustrate a hot wire type of air flow meter according to a second embodiment of the present invention. The difference from the first embodiment shown in FIGS. 2 to 5 will now be described.

A body 60 forming the air intake line and a probe holder block 63 disposed within the former are, unlike those in the first embodiment, integrally diecast-formed. The probe holder 63 is provided, like that in the first embodiment, with a bypass 62 which consists of an axial circular-shaped bypass portion 62b having a circular cross-sectional shape and a radial bypass portion 62c also having a circular cross-sectional shape. The radial bypass 62c is formed by mechanically machining, from outside, the wall of the body 60 at the opposite position to the circuit unit 2. An outlet port face 62d of the bypass is counterbored by an end mill or the like in the above-described direction. Therefore, a windshield 64 of the outlet port face 62d includes, as shown in FIG. 7, wall portions 65a and 65b covering the two sides of the outlet port face 62d. The walls 65a and 65b covering the two sides are further effective to reduce disorder of flow due to mixture of flows. A hole bored for the purpose of performing boring and counterboring is plugged by a plug 72. A rib body 66 is provided for the purpose of smoothly passing molten metal at the time of die-cast forming.

A flow meter inlet portion 61a is formed in a curved throttle shape in such a manner that its curvature starts small and it becomes then moderate. A full-mesh body 70 is fastened in the front-half portion of the throttle by a snap ring 71. The length from the inlet port of the axial bypass 62b to the hot wire element 2a is designed to be longer than that described in the first embodiment According to this embodiment, a further low noise hot wire type of flow meter can be achieved only at a low cost.

FIGS. 8 and 9 illustrates a hot wire type of flow meter according to a third embodiment of the present invention. In this embodiment, a probe holder block portion (projecting portion to the main stream) 83 forming a bypass 82 is, like that in the second embodiment, integrally diecast formed with a body 80. The difference from the second embodiment lies in that a rib 86 connected to a portion 83 projecting to the main stream for improving molten metal flow is designed in such a manner that its upper stream front end portion extends from the inlet port face 82a of the bypass to the upper stream of the flow. As a result of such structure, the turned flow from the upper stream of the flow meter is prevented so that the full-mesh body employed in the first and second embodiments become needless. Another difference from the second embodiment lies in that a radial bypass 82c disposed perpendicular to a main stream 81 and a bypass 82b are machined in the direction from the sensor circuit 2 from outside of the body 80. As a result of this, the wall in the lower stream of the wind shield wall 84 is machined on the same level as the inner wall of the radial bypass 82c. On the other hand, the outlet port face 82d is machined in the direction of the throttle valve 3 by an end mill or the like so that the wind shield wall 84 is, like that in the second embodiment, formed such that it comprises side walls 85a and 85b. An illustrated plug 86 is provided for the purpose of plugging the hole bored for performing machining.

FIG. 10 illustrates a hot wire type of flow meter according to a fourth embodiment of the present invention. A lower stream side bypass 92c provided in a probe holder block 93 formed integral with a body 90 is disposed to form a sharp angle relative to a upper stream axial bypass 92b. The direction of machining is, like that in the third embodiment, arranged from the detecting circuit 2. The portion which does not serve as the flow passage is plugged by a plug 95. As a result of such structure, a packing portion 2d of the circuit unit can be arranged not to interrupt the boring work, and as well the pipe line resistance of the bent portion can be increased. Therefore, a further strong structure against backfire can be achieved. An outlet port end 92d in the lower stream bypass 92c is machined in the direction from the throttle valve 3 so that a part of a projecting portion 93 can be retained in the form of a pent-roof member 94, and is formed in parallel to the main stream.

Although omitted from the illustration, another embodiment can be employed in which the angle formed between the upper stream bypass 92b and the lower stream bypass 92c is made larger than a right angle, that is, an obtuse angle. In this case, forming of the bypass 92c will be performed from outside of the body wall opposite to the detecting circuit 2. By designing the angle formed by the bypass 92b and 92c to be an obtuse angle, the pipe line resistance in this angled portion can be reduced. Therefore, the average flow velocity in the bypass 92b can be increased. Since the flow velocity in the bypass 92b is determined by the total pressure loss of the bypass 92 and the flow velocity and the pressure loss of the main flow passage 91, the flow velocity in the bypass 92b can be adjusted by determining this angle of the bent portion.

Figure 11:
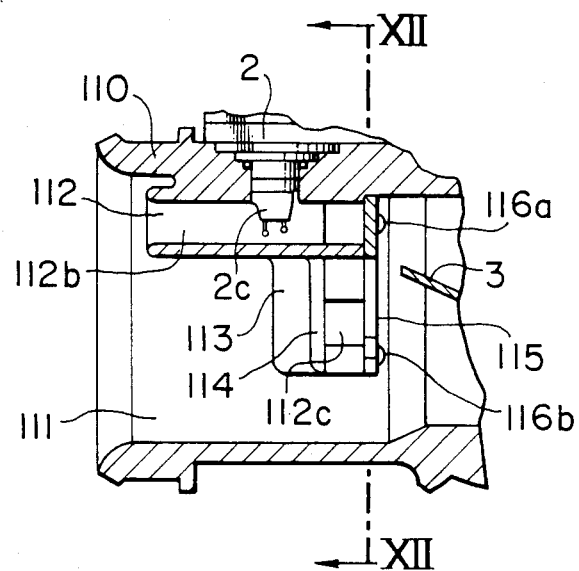
FIG. 11 is a vertical cross-sectional view illustrating a fifth embodiment of the present invention.
Figure 12:
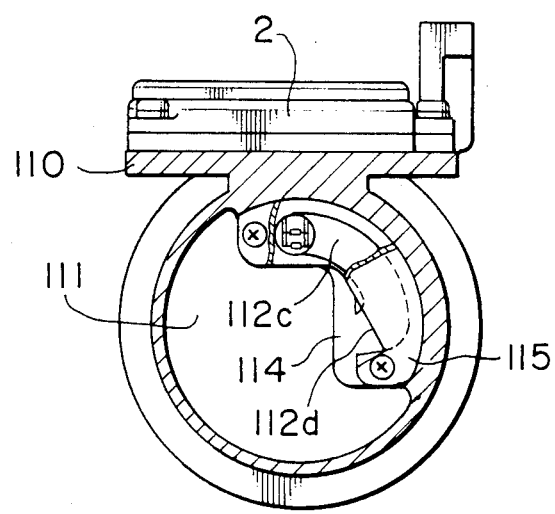
FIG. 12 is a cross-sectional view taken along the line XII—XII in FIG. 11.

FIGS. 11 and 12 illustrates a hot wire type flow meter according to a fifth embodiment of the present invention. In this embodiment, a portion 113, which forms a bypass 112, projecting to the main flow passage 111 is formed so as to be along the inner wall of a body 110. Therefore, a lower stream bypass 112c perpendicular to a upper stream bypass 112b is substantially faces radially, but in the form of a circular arc of substantially 90° facing circumferentially. This shape can be machined by an end mill or the like from the direction of the throttle valve 3. Therefore, the wall of the lower stream bypass facing the throttle valve 3 is formed by an additional plate-like cover 115. The plate-like cover 115 is fastened to a projecting wall 113 by bolts 116a and 116b. An outlet port 112d of the lower stream bypass is also formed in parallel to the main stream, but the plate-like member 115 is partially cut off. Therefore, it is arranged in such a manner that a part of the projecting portion 113 becomes a wind shield wall 114 having a sufficient height to prevent main stream flow.

The pipe line flow resistance of the thus-formed bypass 112 is substantially composed by the resistance of the right-angle bent portion, the resistance due to the shape of the elbow having a square cross-sectional shape and small curvature of substantially 90° and the frictional resistances of the flow passages. Therefore, it can be, depending upon the way to select the cross-sectional area, easily enlarged with respect to that in the first embodiment. Therefore, the structure according to this embodiment exhibits excellent backfire resistance and pulsation damping characteristic. Furthermore, the above-described type of structure exhibits an advantage when an injector is disposed in front of the throttle valve as in a single point injection system.

Figure 13:
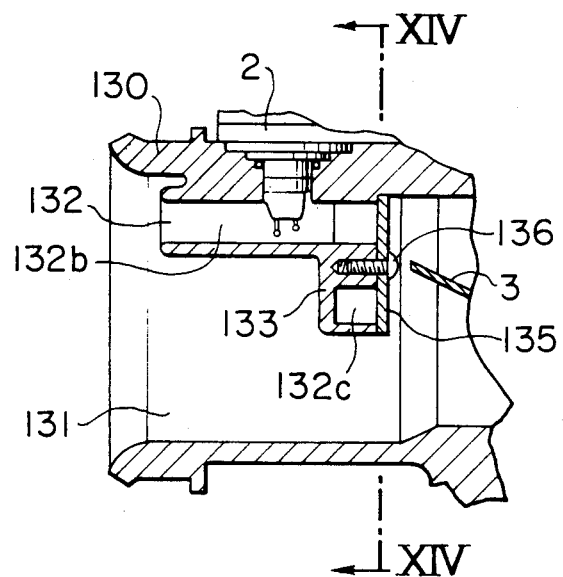
FIG. 13 is a vertical cross sectional view illustrating a sixth embodiment of the present invention.
Figure 14:
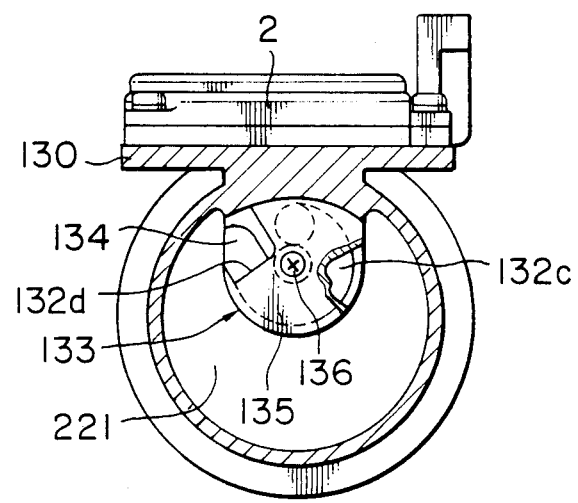
FIG. 14 is a cross-sectional view taken along the line XIV—XIV in FIG. 13.

FIGS. 13 and 14 illustrate a hot wire of flow meter according to a sixth embodiment of the present invention. This embodiment is characterized in that a bypass having a relatively large fluid resistance is arranged to be a projecting portion to a main flow passage having a relatively small volume. That is, a bypass 132c disposed in the lower stream to a bypass 132b in which the hot wire element is disposed is shaped in the form of an annular shape. This bypass 132c is also formed by an end mill or the like from the direction of the throttle valve 3. A plate-like cover 135 is attached by a bolt 136. Furthermore, a part of the projecting portion is, like that in the fifth embodiment, arranged to be a wind shield wall.

The pipe line flow resistance of the thus-formed bypass 132 is composed by the resistance of the substantially right-angle bent portion, the resistance due to the shape of the elbow having a square cross-sectional shape and a relatively large curvature of substantially 270° and the frictional resistances of the relatively long flow passage. Therefore, it can be longer than the fifth embodiment. Therefore, it is advantageous when it is applied to an engine involving a relatively large air intake pulsation.

Figure 15:
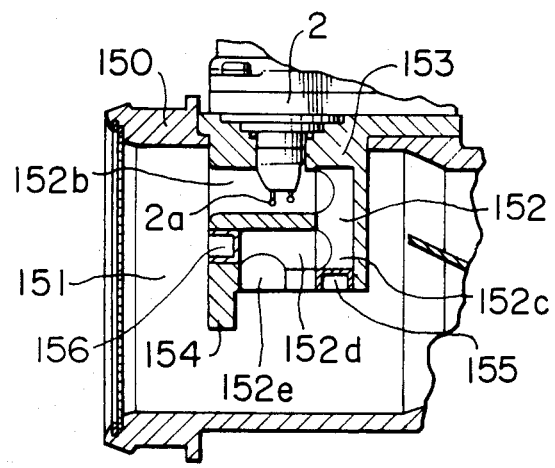
FIG. 15 is a vertical cross-sectional view illustrating a seventh embodiment of the present invention.

FIG. 15 illustrates a hot wire type of flow meter according to a seventh embodiment of the present invention. This embodiment is characterized in that a bypass having a rather great flow resistance than that of the sixth embodiment is formed with its widthwise dimensions limited. A body 150 is individually formed. A bypass 152 is formed in a probe holder block 153 coupled to the circuit unit 2, this bypass comprising a bypass 152b formed in parallel to a main flow passage 151, a bypass 152c formed perpendicular to the same, a bypass 152d formed perpendicular to this bypass 152c and extending to upper stream direction of the main stream and a bypass 152e formed perpendicular to this bypass 152d and facing radially. Each of the bypasses is designed to have a circular cross-sectional shape, and the portion which does not serve as the flow passage is plugged by plugs 155, 156. A portion 154 formed by further extending the wall of the block 153 disposed in the upper stream of the main stream is formed so as to serves as a wind shield wall to protect the outlet port of the bypass 152e.

The flow resistance of the thus-formed bypass 152 is composed by the resistance due to the shape of the line formed by three right angle bent portions and the resistance in porportional to the relatively long distance of the flow passage. Therefore, the resistance is further increased with respect to the sixth embodiment. As a result, it is advantageous when used in an engine involving a great air intake pulsation. Furthermore, the flow rate distribution to the bypass with respect to that to the main stream can be reduced in the great flow rate region, that is, the maximum flow velocity attacking the hot wire element 2a can be reduced so that an effective measurement against dust adhesion contamination driving a long time period can be taken.

Figure 16:
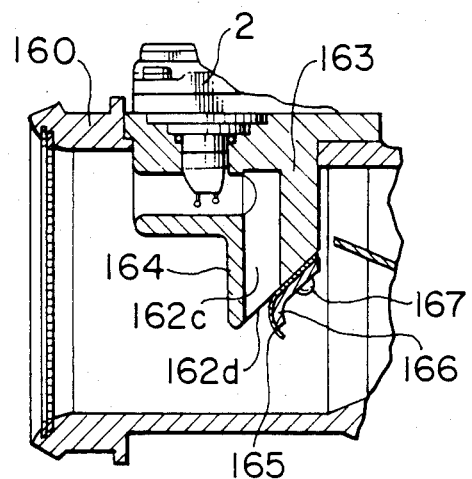
FIG. 16 is a vertical cross-sectional view illustrating an eighth embodiment of the present invention.

FIG. 16 illustrates a hot wire type of flow meter according to an eighth embodiment of the present invention. A probe holder block 163 is individually formed from a body 160, but is coupled with the detecting circuit 2 and is detachable to the body 160. An outer port face 162d of a bypass 162c formed perpendicular to the main stream is, as shown in the figure, inclined with respect to the main stream. Therefore, introduction of the reversed flow into the bypass easily caused by such structure is prevented by a stopper valve 165 formed by a thin steel plate or the like. The stopper valve 165 is, with the aid of a retainer 166, secured to a probe holder block 163 by a bolt 167. The stopper valve is, in a normal state, and as shown in the figure, arranged to be opened for the purpose of excessively interrupting the flow through the bypass outlet and making the flow downward. It is arranged to stop the outlet port 162d by a dynamic pressure effected at the time of occurring the reversed flow so that introduction of the reversed flow into the bypass is prevented. When the dynamic pressure is released, it returns to the state shown in the figure. Since the bypass outlet port face is made inclined, the roll of the wind shield is performed by the upper stream side wall with respect to the main stream of the entire wall forming the bypass 162c.

Figure 17:
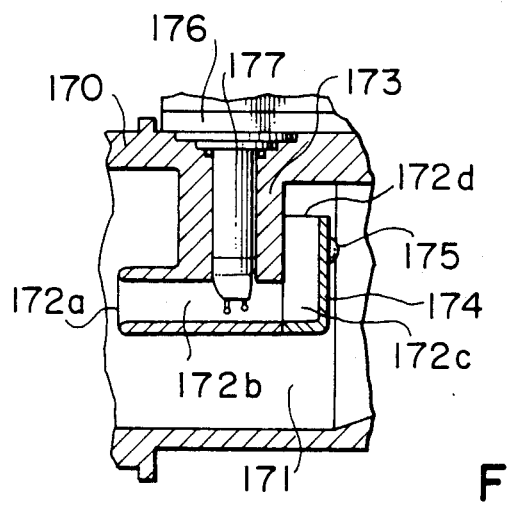
FIG. 17 is a vertical cross-sectional view illustrating a ninth embodiment of the present invention.

FIG. 17 illustrates a hot wire type of flow meter according to a ninth embodiment of the present invention. A block holder block 173 is formed integral with a body 170. The difference from the above-described embodiments lies in that a bypass outlet port 172a is opened at the central portion of a main stream 171. Therefore, a radial bypass 172c formed perpendicular to an axial bypass 172b formed in parallel to the main stream is arranged from the central portion of the main stream toward the inner wall of the flow passage. A radial bypass 172c is formed by a wall in the lower stream of the main stream and a molded cover 174. The molded cover 174 is fastened by a bolt 175. As a result of the thus-formed structure, a bypass outlet port 172d is protected by the probe holder block 173 serving as a wind shield so that the bypass flow passing through the outlet is not affected by the main stream. The difference of the structure according to this embodiment from the above detecting circuit 2 lies in that a circuit unit 176 having a relatively long holder portion 177 is employed. An advantage involved in this embodiment is that, since the inlet port 172a of the bypass is disposed at the central portion of the main stream 171, a relatively stabilized flow rate distribution characteristics and noise characteristics can be obtained. On the other hand, since the length of the bypass 172 needs to be insufficient, causing the pulsation stabilization to be slightly insufficient.

Figure 18:
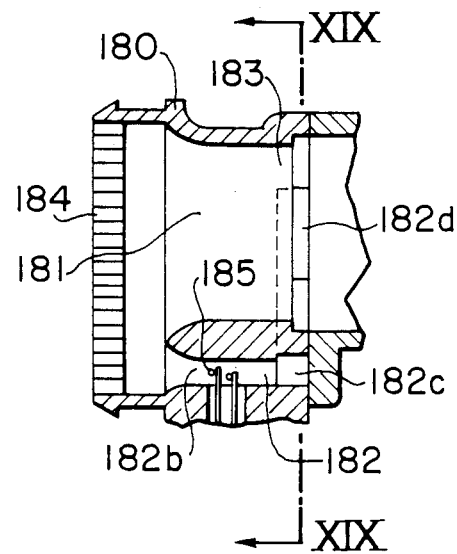
FIG. 18 is a vertical cross-sectional view illustrating a tenth embodiment of the present invention.
Figure 19:
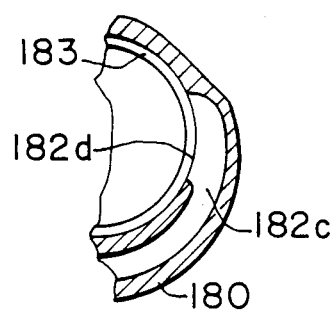
FIG. 19 is a vertical cross-sectional view taken along the line XIX—XIX in FIG. 18.

FIGS. 18 and 19 illustrate a hot wire type of flow meter according to a tenth embodiment of the present invention. In this embodiment, the whole body of a bypass 182 is disposed outside a main flow passage 181, but is disposed within a flow meter body 180. That is, the inlet port of the bypass 182b is arranged to be on the same level as the inlet port of the main stream 181. A bypass 182c in the lower stream to a hot wire element 185 is designed to be an annular shape surrounding the main flow passage 181. The outlet port 182d opens in the circumferential wall of the main flow passage which is expanded to be a stepped shape immediately in front of the outlet port 182d. That is, the radius of the main flow passage in which the outlet port 182d is provided is enlarged than the radius of the main stream immediately in front of the same by substantially the width of the outlet port 182d. Therefore, since the main flow passage wall 183 immediately in front of the outlet port 182d has a roll as a wind shield wall, any unnecessary pressure loss can be prevented and low noise system can be achieved.

Figure 20:
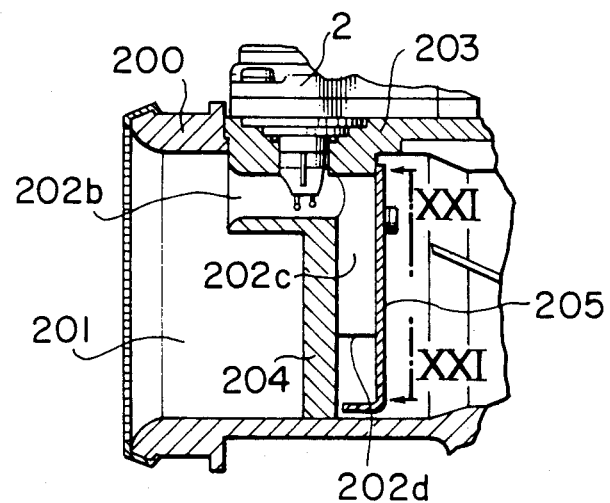
FIGS. 20, 21 and 22 illustrate an eleventh embodiment of the present invention.
Figure 21:
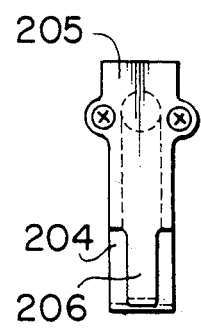

FIGS. 20 and 21 illustrate a hot wire type of flow meter according to an eleventh embodiment of the present invention. A probe holder block 203 is individually formed from a body 200, with the inside thereof being provided with a bypass 202b formed in parallel to the main stream and a radial bypass 202c having a relatively longer length with respect to that described in the first embodiment. This bypass 202c is formed in the lower stream of the main stream by a groove having a square cross sectional shape and a cover 205. An outlet port 202d of the bypass comprises a wind shield wall 204 formed by extending the probe holder block 203 in the upper stream of the main stream and as well a wind shield wall 206 formed by extending a cover 204 in the lower stream. In this embodiment, the width of the wind shield wall 206 is made smaller than that of the bypass 202c.

The reason for this is to prevent the bypass flow at the outlet port thereof from being excessively disordered by the cover 206. This measurement is a critical factor to enhance the effect of the upper stream wind shield. The wind shield wall 204 for the outlet port 202d in the upper stream of the main stream is, as described above, effective to reduce noise at the time of normal state, that is, when the flow is normal. On the other hand, the wall 206 in the lower stream can significantly reduce the introduction force of the reversed flow due to backfire or blowback into the bypass. That is, the flow can be separated into two currents by this wind shield 206, and the two currents interfere with each other in front of the bypass outlet 202d so that the introducing force can be weakened. This type of structure exhibits an excellent intake air pulsation damping characteristics when used in an engine involving occurrence of frequently blowback.

Figure 22:
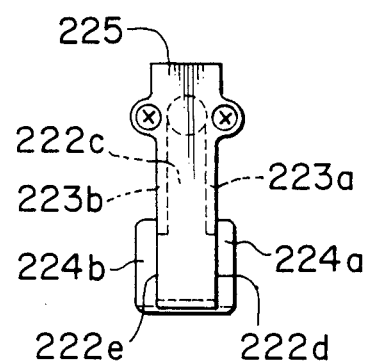

FIG. 22 illustrates a hot wire type of flow meter according to a minor change of the eleventh embodiment of the present invention. A cover 225 is designed in such a manner that the width thereof is maintained to outlet ports 222d and 222e at which side walls 223a and 223b forming a radial bypass 222c are cut off. Therefore, the width of the portion corresponding to the wind shield wall 204 shown in FIG. 20 is made large for the purpose of forming wind shield walls 224a and 224b to serve for the bypass outlets 222d and 222e.

Figure 23:
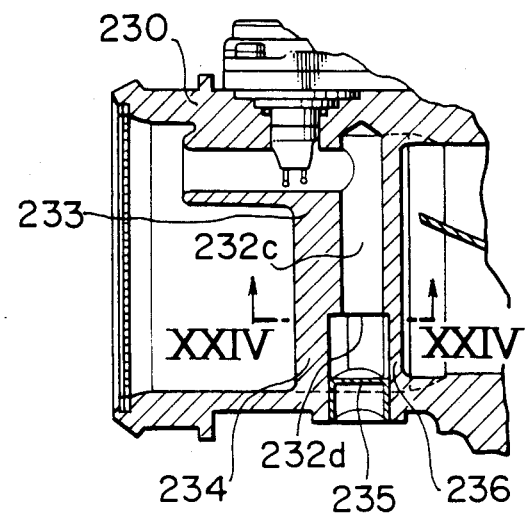
FIG. 23 is a vertical cross-sectional view illustrating a twelfth embodiment of the present invention.
Figure 24:
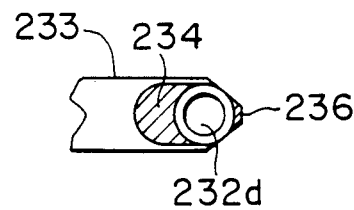
FIG. 24 is a cross-sectional view taken along the line XXIV—XXIV in FIG. 23.

FIGS. 23 and 24 illustrate a hot wire type of flow meter according to a twelfth embodiment of the present invention. This embodiment is characterized in that the structure shaped like the eleventh embodiment is formed in a probe holder block formed integral with a body 230. A radial bypass 232c is bored from outside of the body, and its outlet port 232d is also machined by an end mill or the like in the same direction. At this time, in order to form a wind shield wall 234 in the upper stream of the main stream and a wind shield wall 236 in the lower stream of the same, a probe holder block 233 is formed. A plug 235 plugs an unnecessary hole after the machining has been completed. An effect obtained in this embodiment is, in principle, the same as that obtained in the eleventh embodiment, but the structure can be performed easier, causing cost to be reduced.

Figure 25:
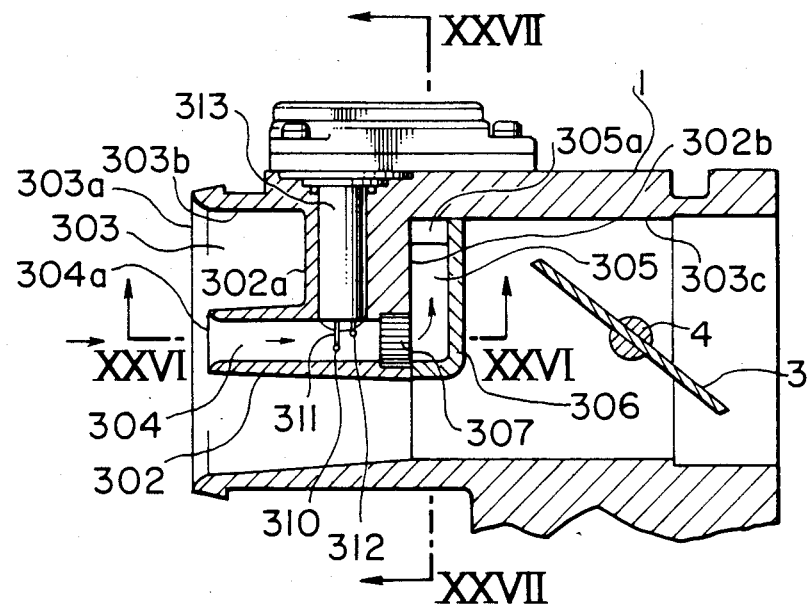
FIG. 25 is a vertical cross-sectional view illustrating a thirteenth embodiment of the present invention.
Figure 26:
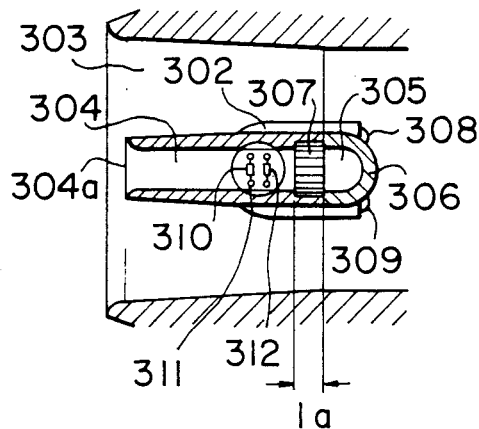
FIG. 26 is a cross-sectional view taken along the line XXVI—XXVI in FIG. 25.
Figure 27:
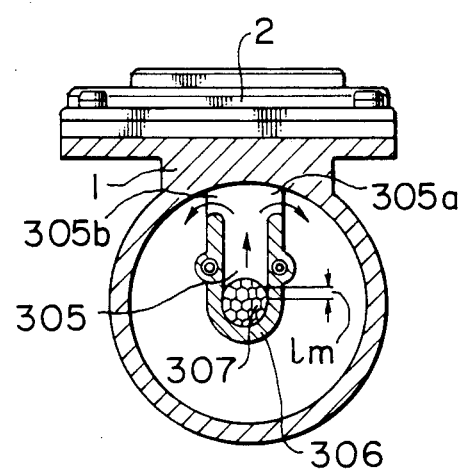
FIG. 27 is a cross-sectional view taken along the line XXVII—XXVII in FIG. 25.

FIGS. 25, 26 and 27 illustrate a hot wire type of flow meter according to a thirteenth embodiment of the present invention.

The body 1 constitutes the air intake line of an internal combustion engine. Air is introduced from left in the figures. The internal combustion engine is disposed in the lower stream (right in FIG. 1) of the flow.

The body 1 in principle forms a cylindrical main flow passage 303. An inlet port 303a of the main flow passage 303 is designed in the form of a bell-mouth. The projecting portion 2 is formed on the inner wall of the body 1 to the main flow passage 303. At the front end portion of this projecting portion 302 is formed the bypass 304 in parallel to the main flow passage 303 in such a manner that a bell-mouth shaped inlet port 304a thereof is disposed at the central portion of the main flow passage 303. The inlet port 304a is formed projecting over a wall 302a of the projecting portion, and the distance from the inlet port 304a to a hot wire element 310 is twice the inner diameter of the bypass. The hot wire element 310 secured to a support column 311 is, together with a temperature compensation element 312, disposed within the bypass 304 as illustrated. As a result of this, a hole through which a molded portion 313 of the support column 311 coupled to the circuit unit can be inserted from outside of the body 1 is formed in the projecting portion 302. In the lower stream of the hot wire element 310, a lattice body 307 in the shape of a honeycomb made of an aluminum foil is formed by inserting and coupling from the rear end portion of the projecting portion 302. In the lower stream of the lattice body 307, a bent bypass 305 is formed by a rear end wall 302b of the projecting portion 302 and a cover 306. The cover 306 is secured to the projecting portion 302 by, in this case, bolts 308 and 309. In the main stream 303 in the lower stream of the cover 306, with the throttle valve 3 being driven by the shaft 4 coupled to the body 1 is disposed.

An inner wall 303b of the main flow passage 303 is shaped in such a manner that it allows the flow passage to be enlarged toward the upper stream. On the other hand, an inner wall 303c of the main flow passage 303 adjacent to the position at which the throttle valve 3 is disposed is formed to maintain the constant diameter by machining, but it is molded in such a manner that the diameter of the portion in the vicinity of the rear end surface 302b of the projecting portion 302 is made relatively small. That is, the body 1 is molded and made of a casted material manufactured with an intermediate mold (casting) capable of being removed to both right and left directions, the mold being arranged to be split at the surface adjacent to the rear end wall 302b of the projecting portion 302.

A void arrow illustrates the air flow. Thanks to the throttle effect of the bell-mouth shape of the inlet port 303a of the main flow passage and the structure in which the inlet portion 304a of the bypass, a relatively rectified flow is introduced into the bypass 304. Furthermore, by virtue of the friction of the inner wall of the bypass 304, the flow in the bypass 304 can be rectified so that an effect can be obtained that a flow in which disorder is prevented and having a uniform flow velocity distribution can be obtained immediately before a hot wire element 310. In the immediately lower stream portion of the lattice body 307, the flow is bent by 90° and is caused to flow upward within the bent bypass 305 along the rear end wall 302b of the projecting portion. At the position bent by 90°, the flow is disordered and becomes unsteady due to the pulsation of the engine. However, the lattice body 307 exhibits an effect to damp the changes in the flow and the pressure so that they are prevented from transmission to the upper stream. The flow in the bent bypass 305 is, as shown in FIG. 27, attacks the inner wall of the main pass, and is overflowed through bent bypass outlets 305a and 305b so as to be joined in the main stream. A cover 306 forming the bent bypass 305 prevents the direct introduction of the reversed flow due to backfire of the engine into the bypasses 305 and 304 and the bent bypass 305 itself has an effect to damp the reversed flow and the pulsation.

Figure 28:
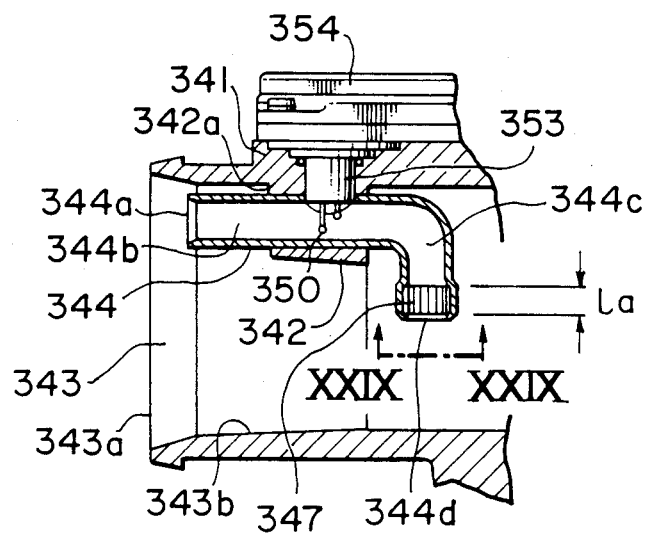
FIG. 28 is a cross-sectional view illustrating a fourteenth embodiment of the present invention.
Figure 29:
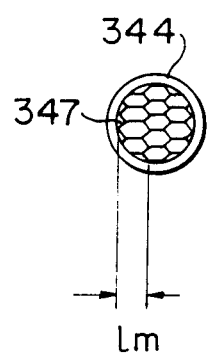
FIG. 29 is a cross-sectional view taken along the line XXIX—XXIX in FIG. 28.

FIGS. 28 to 29 illustrate a hot wire type of flow meter according to a fourteenth embodiment of the present invention. An inlet port 343a of a main flow passage 343 is tapered such that the inner wall thereof is relatively rapidly contracted toward the lower stream side. A straight bypass 344b formed in parallel with a main flow passage 343 and a bypass pipe 344 forming a bent bypass 344c are inserted and coupled in a projecting portion 342 formed by machining the inner wall of the body 1.

An inlet port 344a of the bypass pipe 344 is disposed away from a main flow passage wall 343b or a projecting portion wall 342a, but adjacent to the rear end portion of the tapered portion of the main flow passage inlet port 343a. An inlet port 344a of the bypass pipe 344 is also tapered reducing the diameter thereof toward the lower stream. The distance from the inlet port 344a to the hot wire element is, in this case, arranged to be twice the diameter of the bypass. A molded portion 353 formed integral with a circuit 354 penetrates the body 1 and the upper wall of the bypass pipe 344 so that a hot wire element 350 is disposed within the bypass 344b. A lattice body 347 is disposed at the outlet portion of the bypass pipe 344 in the lower stream of the bent bypass 344c.

The taper shape of the inlet portion 343a of the main flow passage exhibits an effect to increase the air flow introduced into the bypass (pipe) 344 since it throttles the air introduced and further to reduce the disorder of the flow passing through the opening 344a of the bypass. The taper shape of the opening portion 344a of the bypass and the length of the bypass 344b to the hot wire element 350 contributes to rectifying the flow attacking the hot wire and to making the flow velocity uniform so that the system noise can be reduced.

The bent bypass 344c and the lattice body 347 are effective to damp the reversed flow and the pulsation transmitted from the engine so that the hot wire element can be protected from the reversed flow and effective to stabilize the output. Furthermore, the lattice body 347 at the outlet port of the bypass pipe 344 prevents transmission of the disorder of the main flow due to the discharged air from the bypass outlet 344d to the upper stream. In this embodiment, since the bent bypass 344c can be formed by using a pipe, it is advantageous to provide the lattice body at the outlet portion of the pipe.

Figure 30:
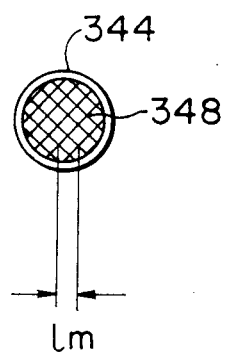
FIG. 30 is a view taken along the line XXIX—XXIX in FIG. 29 in which a state where an lattice body according to another embodiment is employed in the state shown in FIG. 29.

FIG. 30 shows a structure that honeycomb shaped (hexagon) lattice body 307 or the 347 is designed to be a square shape in the cross section thereof.

In the thirteenth embodiment shown in FIGS. 25 to 27, the projecting portion 302 and the bypass cover 306 formed integral with the body and the wall to which the circuit unit 2 of the body 1 is secured may be integrally formed so as to be inserted into and coupled to the body.

Figure 31:
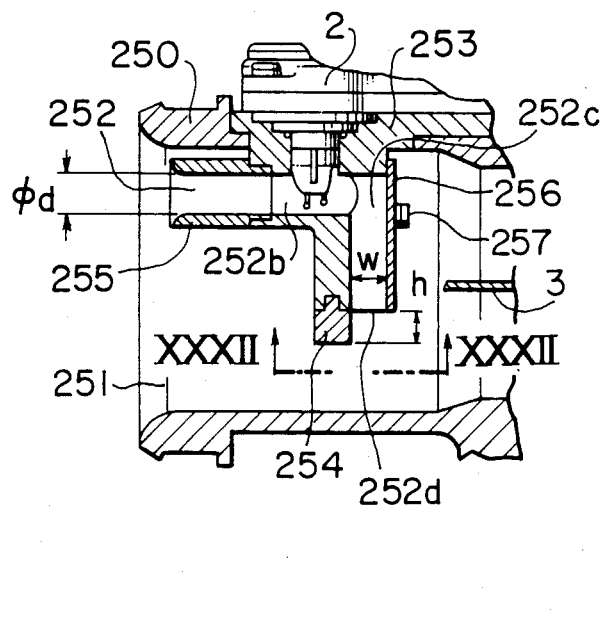
FIGS. 31 and 32 illustrate the structure of a model with which effect of the wind shield wall against noise is experimented.
Figure 32:
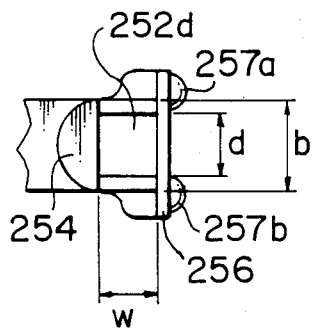
Figure 33:
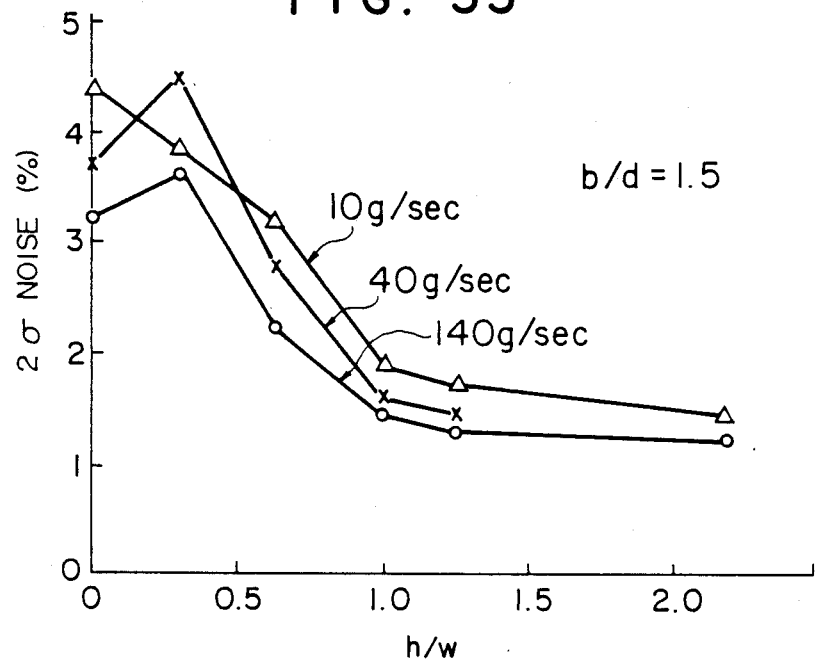
FIG. 33 illustrates the result of the experiment.

FIGS. 31 to 32 illustrates the structure of a model to which an experiment on the effect of the dimension of the wind shield walls against noise was subjected. Therefore, this structure is included within embodiments of the present invention. FIG. 33 shows a result of this experiment.

Referring to the structural drawing, experiment conditions and so forth will now be described. A prove holder block 253 coupled to the circuit unit 2 is individually formed from a body 250. A bypass 252 is formed in the block 253, this bypass comprising an axial bypass 252b formed in parallel to a main flow passage 251 and a radial bypass 252c. The radial bypass 252c is, when the same is not assembled, machined by an end mill from the direction of the throttle valve 3 to be a flow passage having a cross-sectional shape of a square having a width d and depth w. A cover 256 secured by a bolt 257 is attached to the radial bypass 252c. On the other hand, the axial bypass is designed to be a flow passage having the cross sectional shape of a circular of an inner diameter of 1. In order to reduce the upper stream disorder, a relatively long axial direction is achieved by attaching a pipe 255.

FIG. 33 shows a result of the experiment performed in such a manner that a standard round air filter (annular shape) is used in the upper stream of the body 250, under a relatively reduced drift state, and a full-mesh body is not provided at the inlet of the flow meter. The flow rate illustrated as 10 g/sec, 40 g/sec and 140 g/s is changed by a sonic stand. In order to examine the relationship between the height h of a wind shield 254 and the axial width w of the outlet port of the bypass, a plurality of wind shield walls 254 each having different height h are used in such a manner that they are changed. The illustrated experiment result is obtained in a case where the ratio b/d of the width b of the wind shield wall and the width d of the bypass outlet port (radial direction) is 1.5. The axis of abscissa shown in FIG. 33 is h/w. As can be clearly seen from the experiment result shown in FIG. 33, noise can be, depending upon the flow rate, that is, the degree of the flow velocity, reduced if an air shield wall having at least h/w of substantially 0.5 or more is used with respect to a case of no air wind shield wall. Within a region from h/w=0.5 to 1.0, the noise is rapidly reduced in accordance with increase in the height of a wind shield wall, but the noise is not significantly reduced even if the height is further increased. Therefore, an effective noise reduction effect can be obtained when $h/w \geq 0.6$, and a sufficient noise reduction effect can be obtained when $h/w \geq 1.0$.

Furthermore, the ratio b/d of the width d of an outlet port of the bypass and the width b of a wind shield wall also affect the noise reduction effect. When the ratio is substantially $1.3 \leq b/d \leq 2.0$, the effect can be enhanced qualitatively. That is, if b/d is too small, turning of the main stream occurs at the side surface, causing the effect to be deteriorated even if h/w is excellent. On the other hand, if it is too large, the wind shield wall acts as a resistance against the main stream. It is unfavorable on the view point of reduction in the entire pressure loss.

As described above, according to the present invention, an accurate measurement of a flow rate can be performed even under various conditions since the above-described structure prevents the reversed flow to a bypass due to backfire or blowback to the bypass and thereby disorder of the flow at the upper stream portion of the flow meter.

What is claimed is:

1. A hot wire type of air flow meter, comprising: a main flow passage forming part of an air intake flow passage of an internal combustion engine, a hot wire element for measuring intake air, and a bypass passage having said hot wire element therein and disposed in said main flow passage, said bypass passage including:
   (a) a first flow passage forming one part of said bypass passage and extending in the axial direction of said main flow passage; and
   (b) a second flow passage forming another part of said bypass passage and extending in the radial direction of said main flow passage, said second flow passage having an outlet opening formed in an end portion thereof, said end portion having a windscreen projection extending, with respect to the air flow in said main passage, radially beyond the outlet opening on the upper stream side of said end portion so as to shield said outlet opening from air flow in said main flow passage and prevent the air flow in said main flow passage from directly impacting on air flowing out of said bypass passage at said outlet opening.

2. A hot wire type of air flow meter according to claim 1, wherein said hot wire element is disposed in said first flow passage of said bypass passage.

3. A hot wire type of air flow meter according to claim 1, wherein said first flow passage is provided eccentrically with respect to the axis of said main flow passage.

4. A hot wire type of air flow meter according to claim 1, wherein a throttle for contracting the width of the flow entering said bypass passage is provided at the inlet portion of said bypass passage.

5. A hot wire type of air flow meter according to claim 1, wherein a member forming said main flow passage and a member forming said first and second bypass passages are formed integral with each other.

6. A hot wire type of air flow meter, comprising: a main flow passage forming part of an air intake flow passage of an internal combustion engine, a hot wire element for measuring intake air, and a bypass passage having said hot wire element therein and disposed in said main flow passage, said bypass passage including:
(a) a first flow passage acting as an air flow line in the same direction as the air flow line of air passing through said main flow passage; and
(b) a second flow passage acting as an air flow line extending across said air flow line of said main flow passage, said second flow passage having an outlet opening formed in an end portion thereof, said end portion having a windscreen projection extending, with respect to the air flow in said main passage, beyond the outlet opening on the upper stream side of said end portion so as to shield said outlet opening from air flow in said main flow passage and prevent the air flow in said main flow passage from directly impacting on air flowing out of said bypass passage at said outlet opening.

7. A hot wire type of air flow meter according to claim 6, wherein said hot wire element is disposed in said flow line of said first flow passage.

8. A hot wire type of air flow meter according to claim 6, wherein said first flow passage is disposed eccentrically with respect to the axis of said main flow passage.

9. A how wire type of air flow meter, comprising: a main flow passage forming part of an air intake flow passage of an internal combustion engine, a hot wire element for measuring intake air, and a bypass passage having said hot wire element therein and disposed in said main flow passage, said bypass passage including:
(a) a first flow line forming one part of said bypass passage and extending in the axial direction of said main flow passage; and
(b) a second flow line forming another part of said bypass passage and extending rat an angle to the direction of said main flow passage, this second flow line having a windscreen projecting member extending in the direction of said second flow line beyond an outlet opening of said bypass passage for preventing direct impingement of the main stream of air in said main flow passage against air exiting said outlet opening, thereby shielding said outlet opening from air flow in said main flow passage.

10. A hot wire type of air flow meter for an internal combustion engine, comprising:
a main flow passage forming an air intake flow passage;
a bypass passage disposed at least partly within said main flow passage for diverting a portion of the air flowing in said main flow passage; and
a hot wire element disposed in said bypass passage for measuring intake air;
wherein said bypass is formed by a first flow passage extending in the axial direction o said main flow passage, and a second flow passage extending at an angle to the axis of said main flow passage from the downstream end of said first flow passage and having an outlet portion with an outlet opening from which air passes from said bypass passage into said main flow passage; and
wherein said second flow passage of said bypass passage is formed with a windscreen projecting portion extending in the direction of said second flow passage beyond said outlet opening on the side of said second flow passage which is upstream with respect to the air flow in said main flow passage, so that said projecting portion shields air exiting said outlet opening from direct impingement by the air flow in said main flow passage.

11. A hot wire type air flow meter according to claim 10, wherein said first flow passage extends perpendicular to said second flow passage so that said bypass passage is L-shaped.

12. A hot wire type air flow meter according to claim 10, wherein said main flow passage and said bypass passage are formed in an integral structure.

13. A hot wire type air flow meter according to claim 10, wherein said bypass passage is disposed entirely within said main flow passage.

14. A hot wire type air flow meter according to claim 13, wherein said second flow passage extends in the circumferential direction of said main flow passage.

15. A hot wire type air flow meter according to claim 10, wherein said hot wire element is disposed in said first flow passage.

16. A hot wire type air flow meter according to claim 10, wherein said first flow passage is disposed eccentrically with respect to the axis of said main flow passage.

17. A hot wire type air flow meter according to claim 10, wherein said first flow passage is concentric with the axis of said main flow passage.

* * * * *